May 14, 1968     M. HUME     3,382,836
DEVICES FOR RENDERING LAND VEHICLES AMPHIBIOUS
Filed May 19, 1966     3 Sheets-Sheet 1

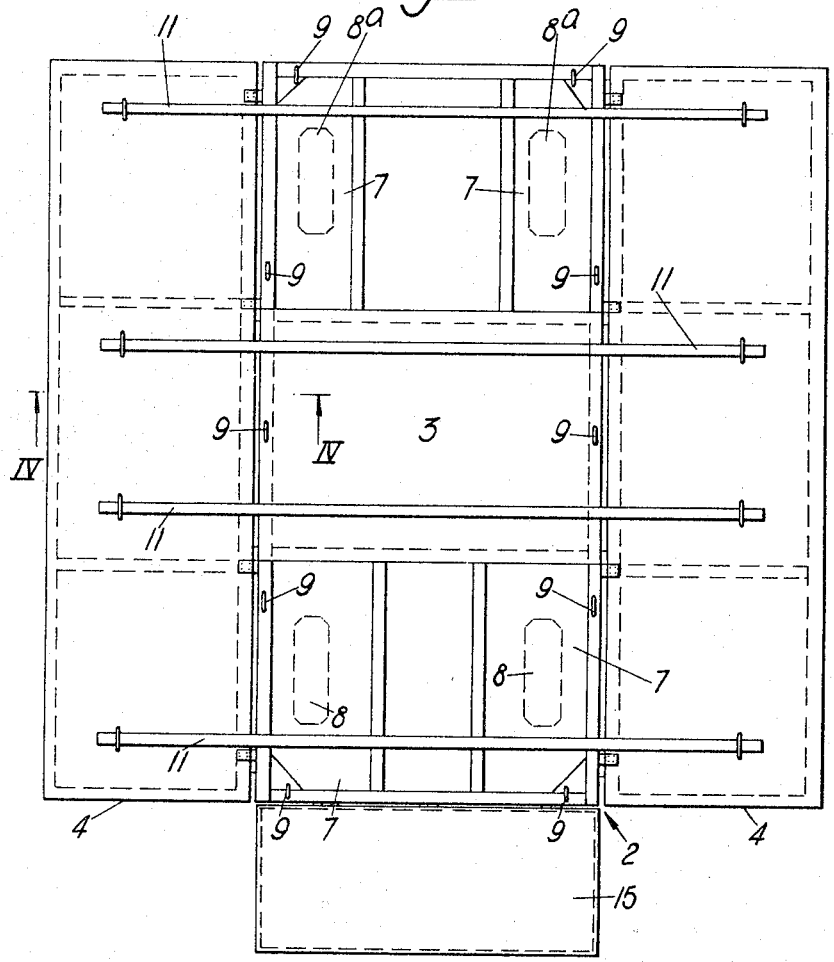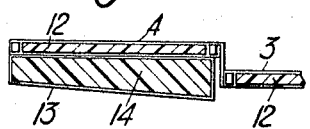

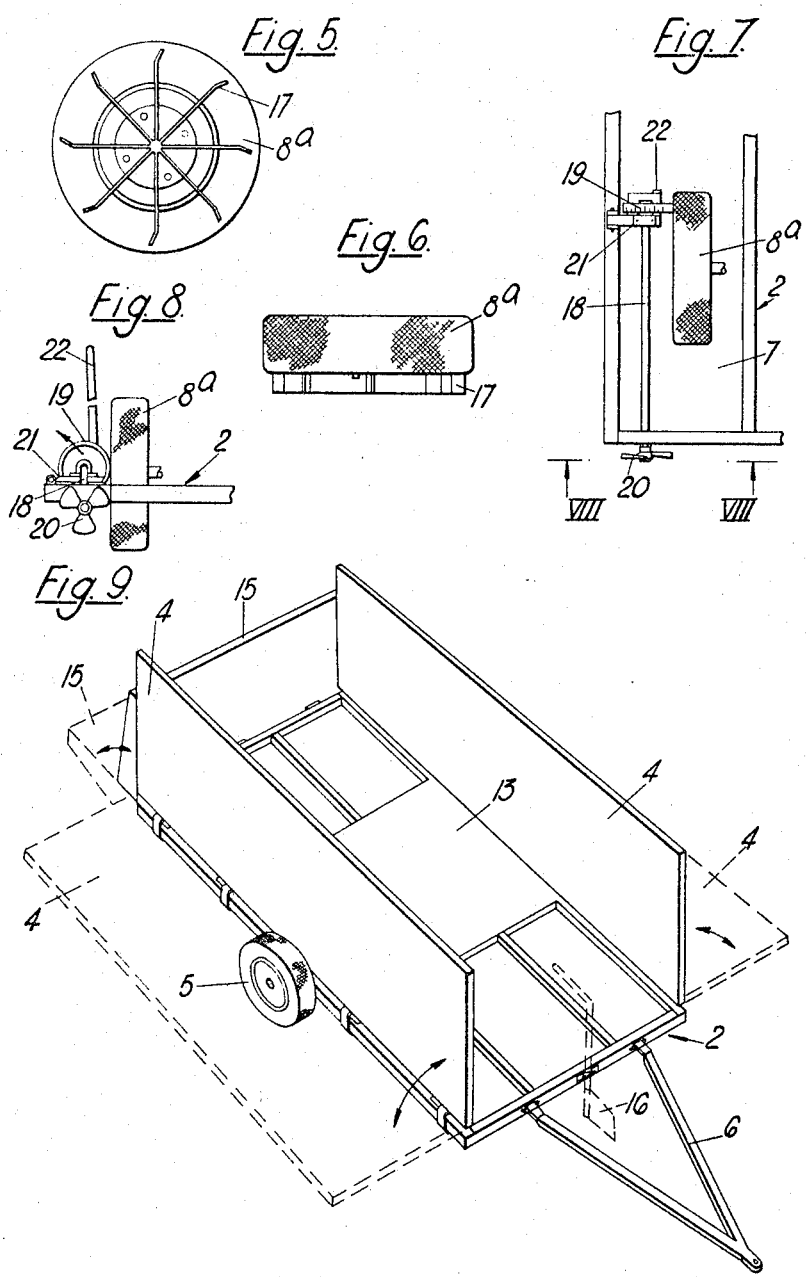

United States Patent Office 3,382,836
Patented May 14, 1968

3,382,836
DEVICES FOR RENDERING LAND
VEHICLES AMPHIBIOUS
Martin Hume, 7 R.D. Masterton,
North Island, New Zealand
Filed May 19, 1966, Ser. No. 551,325
8 Claims. (Cl. 115—1)

ABSTRACT OF THE DISCLOSURE

A device for rendering a wheeled motor vehicle amphibious in which a frame-work having a central portion adapted to receive the vehicle and with such vehicle being secured thereto is provided with side panels hingedly connected to such central portion and adapted to extend laterally when in the operative position and an end panel also hingedly connected thereto and adapted to extend endwise to the operative position. The side and end panels have associated therewith buoyant means.

In addition, the central portion is formed with openings therein so located that the wheels of the motor vehicle will be positioned therein and protrude below the frame-work in order to permit the vehicle thus secured to the device to be driven into the water. In addition, propulsion means for the device which are operable by the driving wheels of the vehicle are provided.

Furthermore, the side and end panels are erectable in an upright manner and ground wheels, together with a tow bar arrangement are operably related with the device so that when such device is not in use for permitting the land vehicle to be amphibious, can be employed as a trailer on land.

---

This invention relates to devices intended for use in rendering vehicles, particularly land vehicles or vehicles intended normally for use on land, amphibious so that they may be transported across water.

An object of this invention is to provide a readily transportable device which can be readily and relatively quickly applied to a vehicle, such device providing buoyancy for the vehicle and the arrangement of the combination providing that the vehicle on the device can be steered and propelled on water.

According to this invention there is provided a device for rendering a motor vehicle amphibious comprising a frame-work having a central portion which is arranged to receive a vehicle and with such vehicle being secured thereto, side panels hingedly connected to such central portion and adapted to extend laterally thereof when in the operative position, the side panels being of double-walled construction and having a foam plastic buoyancy material located between the two walls of each side panel, an end panel hingedly connected to the central portion and adapted to extend endwise with respect thereto when in the operative position, the end panel also being of double-walled construction and provided with a foamed plastic buoyant material between the two side walls thereof, said central portion having openings so located that the wheels of the vehicle can be positioned therein with the lower parts of such wheels protruding or extending below the framework whereby the vehicle with the device secured thereto can be driven into the water, propulsion means operable by the driving wheels of the vehicle are provided to enable the device to be propelled on water and the side and end panels are capable of being disposed in an upright manner so that ground wheels and a tow bar means related thereto permits the device, when not in use for rendering the land vehicle amphibious, permits such device to be used as a land trailer.

Figure 1:
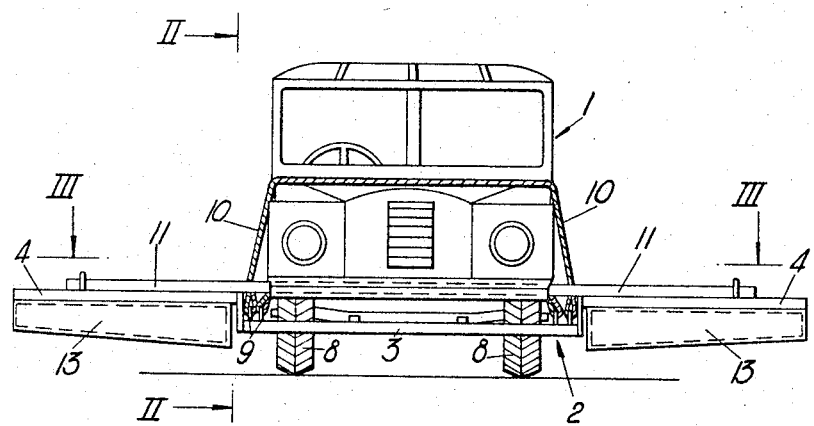
Figure 2:
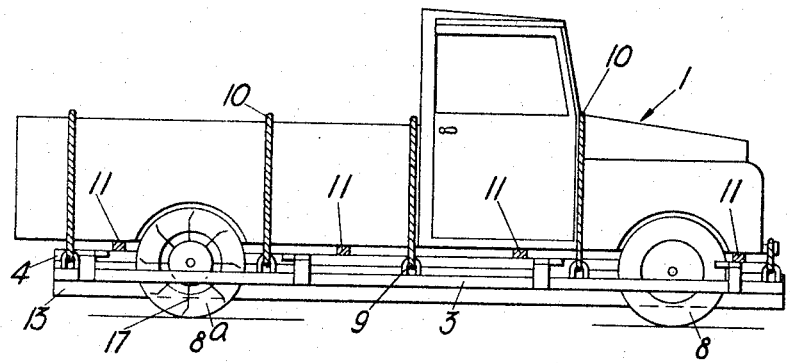

The device of this invention will now be further described, by way of example, with reference to the accompanying drawings in which:

FIGURE 1 is a front elevation of one form of the device attached to a motor vehicle and arranged to support the vehicle in water, FIGURE 2 is a side elevation of the device and vehicle illustrated in FIGURE 1 and in the direction of arrows II—II thereof, FIGURE 3 is a plan view of the device of FIGURE 1 and disassociated from the vehicle, the location of the vehicle wheels being shown in broken outline, FIGURE 4 is a cross-sectional view on line IV—IV of FIGURE 3, FIGURES 5 and 6 illustrate inside elevation and plan view, respectively, of one means for effecting propulsion of the vehicle and device on water, FIGURE 7 is a fragmentary plan view of the device of this invention including an alternative propulsion means therefor, FIGURE 8 is a rear elevational view of the arrangement shown in FIGURE 7 and in the direction of arrows VIII—VIII, and FIGURE 9 illustrates in a perspective view, a preferred embodiment of the invention.

In FIGURES 1 and 2, the vehicle 1 for use with this invention may be such as a Land Rover (registered trademark) or Jeep (registered trademark) kind of road vehicle but it will be appreciated that the invention can be adapted for use with other kinds of land vehicle such as the conventional family motor car.

The frame-work (generally indicated by the arrow 2) may be in the form of, or arranged as, a platform and preferably such frame-work 2 is constructed of a lightweight metal such as an aluminium alloy or like material which may be provided with a timber or light weight metal decking. The frame-work 2 has a central portion 3 provided with side panels 4 forming side flaps which are preferably hinged to the sides of the central portion 3 so as to be movable from a generally horizontal position extending outwardly of the central portion 3 to either a generally vertical position as depicted in the embodiment shown in FIGURE 9 where the device is usable as a trailer for towing on land behind a motor vehicle, or the side panels 4 can be moved over on to the central portion 3 so as to occupy a minimum of space for transport and storage purposes. In this latter arrangement, the device can be folded up for transport on or in the vehicle 1 with which it is to be used and/or stored as desired. However, in the preferred embodiment illustrated in FIGURE 9, the device is provided with ground wheels 5 and a tow bar arrangement 6, both of which are preferably detachable or capable of being moved to positions such that they will not hinder the attachment of the device to a vehicle and will not adversely effect the operation of the device in combination with the vehicle 1.

As more particularly shown in FIGURE 3, the central portion 3 of the frame-work 2 has cut out portions or openings 7 corresponding to the location of wheels 8 and 8a of the vehicle 1 when such vehicle 1 is disposed above the frame-work 2 and the arrangement providing that with the frame-work 2 attached to the vehicle 1, the lower portions of the wheels 8 and 8a of the vehicle protrude through the frame-work 2 (see FIGURES 1 and 2), and the frame-work 2 is drawn up under the vehicle 1 and secured thereto. Securement of the frame-work 2 to the underside of the vehicle can be effected by U-bolts or eyes 9 on the frame-work 2 and ropes or straps 10 which are engaged with the U-bolts or eyes 9 and passed over the vehicle 1. In addition to or as an alternative to such securement arrangement, the frame-work 2 and/or vehicle 1 can be provided with suitable securing brackets (not shown) and/or detachable beams or rods 11 can be utilized, with such means or rods being engageable with U-bolts or brackets on the frame-work 2 and/or side panels 4 thereof and on the underside of the vehicle. Such means or rods 11 further serve to hold the side panels rigid and securely in the open and operable position.

The buoyancy means may take various forms and in one arrangement, illustrated in FIGURE 4, the side panels 4 are of double walled construction, and the walls are constructed preferably of a light weight aluminum alloy material. A buoyancy material 12 is sandwiched between such walls and such buoyancy material 12 can be in the form of a foamed plastics material such as a polyurethane or polystyrene foamed plastics material. The central portion 3 of the frame-work 2 may also be similarly constructed in providing buoyancy for the device.

For very light weight vehicles, such buoyancy arrangement of the side panels 4 may be sufficient to render the vehicle 1 amphibious but it is envisaged that additional buoyancy means will be required. Such additional buoyancy means can include inflatable pads (not shown) which are securable to the underside of the side panels 4 or are locatable in containers 13 attached or attachable to the underside of the said side panels 4. However, the containers 13 attached to or forming part of the underside of the side panels are again filled with a buoyancy material 14 such as a foamed plastics material. Again, the containers 13 are preferably constructed from lightweight metal materials such as aluminum alloy materials.

In addition to the side panels 4 and their containers 13 with the inflatable or other buoyancy means, if other buoyancy and/or stabilizing means is necessary for the vehicle, the forward end of the device can be provided with a further panel or container 15 having buoyancy means, and such panel or container 15 is either detachably engagable with the frame-work 2 or hingeably engaged therewith. As indicated in FIGURE 9, such additional panel or container 15 can serve as the rear end for the trailer form of the device.

Where the device is usable as a trailer, as indicated by way of example in FIGURE 9, suitable bracing or straps (not shown) can be utilized whereby the side panels 4, and rear end panel or container 15 when provided, can be maintained in an upright position relative to the central portion 3 of the frame-work. The frame-work 2 can be further provided with additional decking (not shown) to close the openings 7 for the wheels 8 and 8a of the vehicle 1 when the device is to be used as a trailer.

As hereinbefore indicated, the wheels 8 or 8a of the vehicle 1, when the device is attached thereto, are engaged to protrude through the frame work 2 so that the vehicle 1 with the device attached thereto can be driven into the water. Further, the front wheels 8 thus protruding through the frame-work 2 of the device can act as the steering means whereby the vehicle 1 and device can be steered as the combination is propelled over water. Alternatively, or in addition, and as shown in broken outline in FIGURE 9, the device can be provided with a conventional hand operable tiller or rudder arrangement 16. Alternatively, but not shown, rudder mechanism can be incorporated in the device and such mechanism can be operable either by movement of the front wheels 8 of the vehicle 1 or independently thereof.

Various propulsion means can be utilized for the propulsion of the vehicle 1 and attached device over water and, with reference to FIGURES 2, 5 and 6, the driving wheels 8a of the vehicle 1 (in most cases being the rear wheels 8a of the vehicle) can be provided with paddle attachments 17 which may be securable to the rim or hub of the wheel 8a as indicated by way of example in FIGURES 5 and 6 or (but not shown) may be in the form of hub caps which are provided with paddle attachments and are adapted for use in replacement of the conventional hub caps of the motor vehicle 1. In a still further alternative, not shown, the device can be provided with paddles which are rotatably mounted on the frame work 2 and are adapted to be turned by the rear or driving wheels 8a of the vehicle 1 when located on the device.

In a still further arrangement of this invention and as shown by way of example in FIGURES 7 and 8, the device is provided with at least one propeller arrangement including a propeller shaft 18 which is rotatably mounted on the frame work 2 and such propeller shaft 18 is provided at its forward end with a driven wheel 19 and at its rear end with a propeller or screw 20. The shaft 18 is preferably inclined relative to the horizontal so that the driven wheel 19 is above the frame work and the propeller shaft 18 extends rearwardly and downwardly thereof so that the propeller or screw 20 will be submerged in the water when in use.

The location of such driven wheel 19 is such that when the device is attached to a vehicle 1, the driven wheel 19 will be in contact with, and thus rotatable by, the tire or peripheral edge portion of a driving wheel 8a of the vehicle 1. Preferably there are at least two such propeller arrangements, one being provided on either side of each rear or driving wheel 8a, and in four wheel drive vehicles there can be four such propeller arrangements.

In a preferred form of the invention, the driven wheel 19 and associated end portion of the propeller shaft 18 is rotatably mounted in a bracket arrangement 21 which is, in turn, hingeably connected to the frame work 2 so as to be hingeable outwardly thereof to allow the vehicle 1 to be located in position over the frame work 2. Thereafter, the driven wheel 19 and bracket arrangement 21 can be hingeably moved inwardly of the frame work 2 so that the driven wheel 19 engages with the corresponding and co-operating driving wheel 8a, the arrangement being such that the frictional contact between the driven wheel 19 and the driving wheel 8a is increased as the driving wheel 8a is driven. The propeller arrangement can be provided with a suitable handle 22 to facilitate the movement thereof from and to the inoperative position. Further to facilitate frictional engagement with a driving wheel 8a, the driven wheel 19 can have a serrated rim or provided with a rubber tread or tire. Thus, by this invention, a vehicle can drive to a water's edge towing the trailer form of device and the device can then be removed or detached from the vehicle 1 and opened out. The wheels 5 and tow bar arrangement 6 where provided in the trailer form of the device are removed or moved to inoperative positions, so that the frame work 2 lies substantially flat on the ground. The vehicle 1 can be driven over the frame work 2 and into the desired position with the wheels 8 and 8a located in the openings 7. The frame work 2 can then be lifted up to the underside of the vehicle 1 and secured thereto as aforesaid with the side panels 4 extending outwardly from the central portion 3 and from the vehicle 1 located thereon, and where provided, the additional end panel or container 15 (which may be the rear end of the trailer arrangement of the device) extends forwardly of the vehicle 1. As the case may be, the buoyancy pads may be inflated and/or fitted and the propulsion means engaged with the driving wheels 8a of the vehicle 1.

The vehicle 1 with the device attached is thus rendered amphibious and can be driven into the water and propelled and steered across such water as desired.

Where an inflatable buoyancy means is provided, such means can be inflated in any suitable manner such as by the use of compressed air bottles, foot or hand pumps or by an air compressor attached to or forming part of the vehicle 1.

Further, the formations of the side panels 4 and containers for the buoyancy means, and any additional panels or containers 15 provided for buoyancy means, can be generally rectangular in formation when view in plan, as illustrated, and have tapered formations when viewed in side elevation and/or end elevation, or such formations can be varied as desired and by way of example the additional panel or container 15 forwardly of the device when in water may be rounded or pointed to form the bow of the device as a water craft.

The invention is not to be confined to any strict conformity to the showings in the drawings but changes or modifications may be made therein so long as such changes or modifications mark no material departure from the spirit and scope of the appended claims.

What is claimed is:

1. A device for rendering a wheeled land motor vehicle amphibious comprising a frame-work having a central portion adapted to receive a vehicle and be secured thereto, side panels hingedly connected to the central portion and adapted to extend laterally of such portion when in the operative position, said side panels being of double walled construction and having a foamed plastic buoyant material located between the two walls of each side panel, an end panel hingedly connected to the central portion and adapted to extend endwise thereof when in the operative position, said end panel being of double walled construction and provided with a foamed plastic buoyant material between the two walls thereof, the central portion of the frame-work having openings so located that the wheels of the vehicle can be positioned therein with the lower parts of said wheels protruding below the frame-work whereby the vehicle with the device attached thereto can be driven into the water, propulsion means for the device operable by the driving wheels to enable the device with the vehicle thereon to be propelled on water, said side and end panels being erectable in an upright manner, ground wheels, and a tow bar means for the device so that the device, when not in use for rendering a land vehicle amphibious, is capable of use as a trailer on land.

2. The device as claimed in claim 1 wherein additional containers with inflatable buoyant means are provided for the side panels.

3. The device as claimed in claim 1 wherein supplementary containers containing foamed plastic buoyant material are provided for the side panels.

4. The device as claimed in claim 1 wherein the side panels are arranged to be maintained in a rigidly outwardly extending position relative to the central portion of the frame-work by means of beams and said beams being further engageable with brackets on the underside of the vehicle for securing the device to the vehicle.

5. The device as claimed in claim 1 wherein the framework is provided with a plurality of eyes and is securable to a vehicle by means of ropes which are engaged with the eyes and passed over the vehicle.

6. The device as claimed in claim 1 wherein propulsion of the device on water with a vehicle thereon, is provided by the securement of paddle attachments to the drive wheels of the vehicle.

7. The device as claimed in claim 1 wherein propulsion of the device on water with a vehicle thereon, is effected by a propeller arrangement including a propeller shaft having a driven wheel at one end and a propeller at the other end, the propeller shaft being rotatably mounted on the frame-work and the driven wheel of the propeller shaft being adapted for engagement with a driving wheel of a vehicle so that rotational movement of the vehicle driving wheel effects rotational movement of the propeller shaft driven wheel and thus rotational movement of the propeller.

8. The device as claimed in claim 7 wherein the end portion of the propeller shaft adjacent the driven wheel is rotatably mounted in a bracket hingedly connected to the frame-work so as to be movable outwardly thereof to allow the vehicle to be located in position over said frame-work and thereafter the driven wheel and bracket can be moved inwardly of the frame-work so that said driven wheel engages with the corresponding and cooperating driving wheel of the vehicle, the arrangement being such that the frictional contact between the driven wheel of the propeller shaft and the driving wheel of the vehicle is increased as the driving wheel of the vehicle is driven, and a handle for said bracket extending upwardly thereof to facilitate movement of the propeller arrangement from and to the inoperative position.

References Cited

UNITED STATES PATENTS

| | | | |
|---|---|---|---|
| 3,011,184 | 12/1961 | Curcio | 115—.5 |
| 1,526,258 | 2/1925 | Trasky | 115—1 |
| 1,804,262 | 5/1931 | Lewis et al. | 115—0.5 |
| 2,588,084 | 3/1952 | Bushfield | 115—1 X |
| 3,099,977 | 8/1963 | McLarty | 115—1 |
| 3,308,782 | 3/1967 | Dahl | 115—1 |

FOREIGN PATENTS

| | | |
|---|---|---|
| 1,002,650 | 2/1957 | Germany. |

ANDREW H. FARRELL, *Primary Examiner.*